(No Model.) 4 Sheets—Sheet 2.
J. F. FRENCH.
FILE CUTTING MACHINE.
No. 333,458. Patented Dec. 29, 1885.
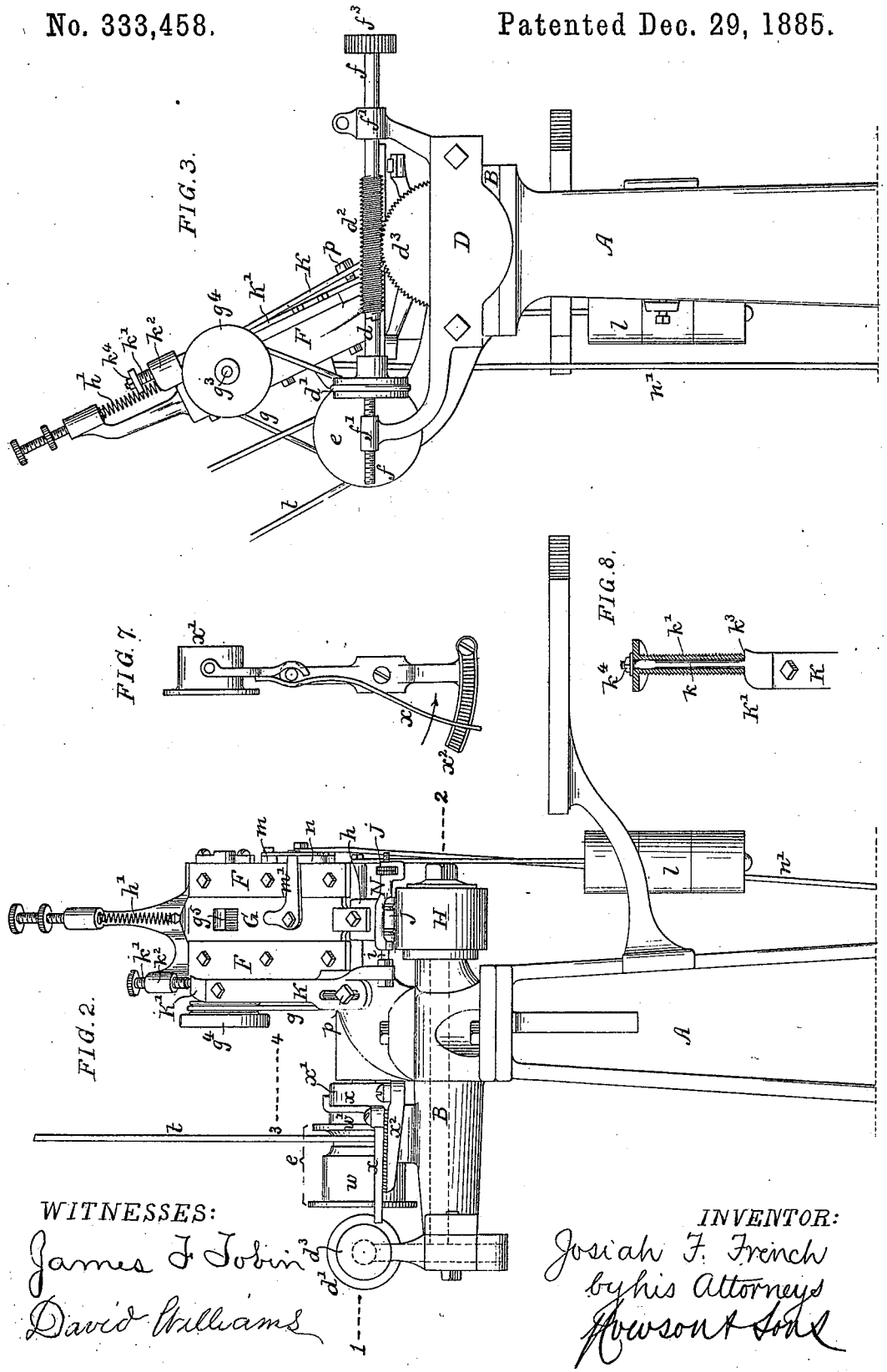
WITNESSES:
James F. Tobin
David Williams
INVENTOR:
Josiah F. French
by his Attorneys
Howson & Sons (No Model.) 4 Sheets—Sheet 3.

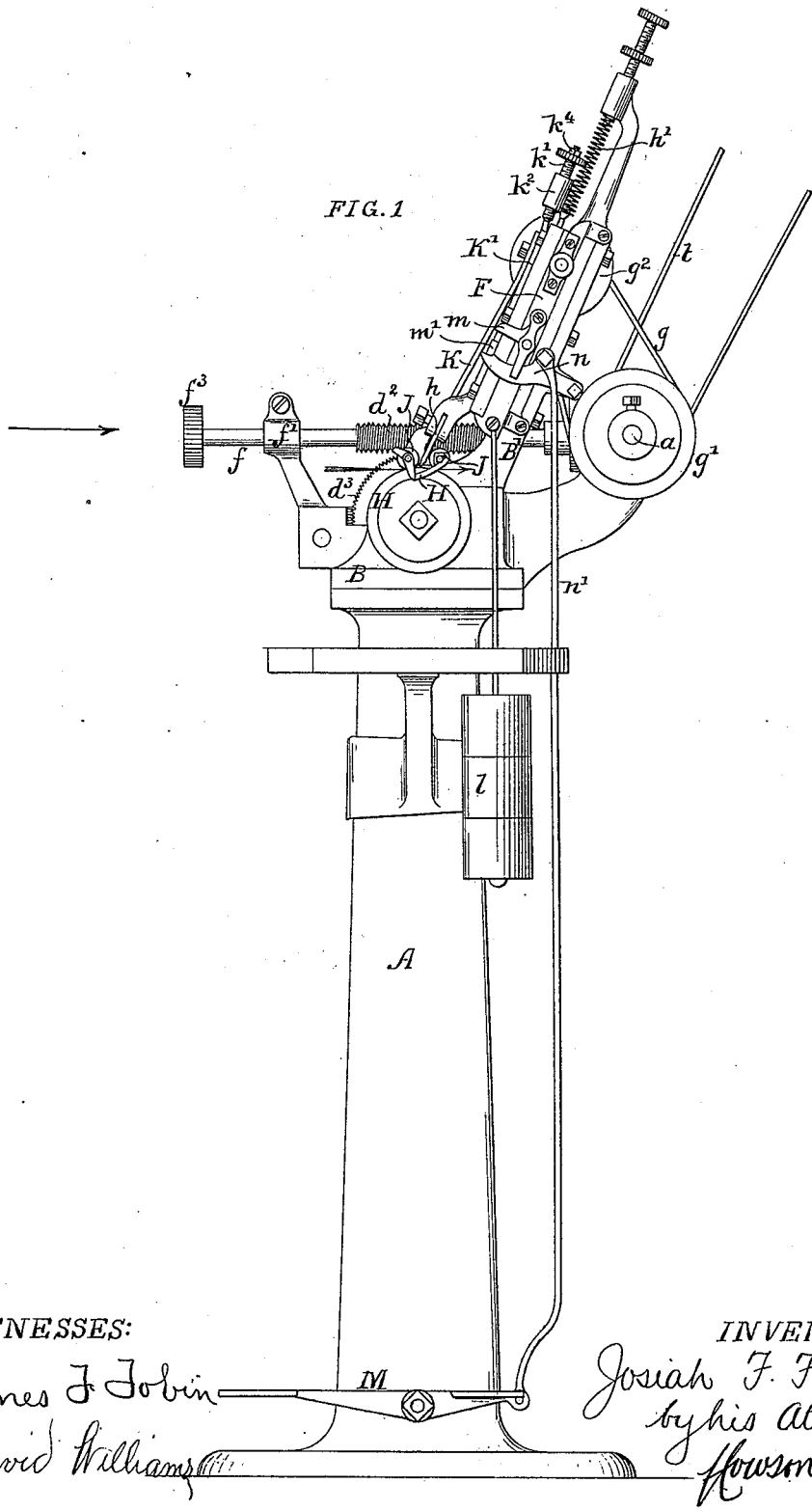

J. F. FRENCH.
FILE CUTTING MACHINE.

No. 333,458. Patented Dec. 29, 1885.

WITNESSES:
James J Tobin
David Williams

INVENTOR:
Josiah F. French
by his Attorneys
Howson & Sons (No Model.)   4 Sheets—Sheet 4.
J. F. FRENCH.
FILE CUTTING MACHINE.
No. 333,458. Patented Dec. 29, 1885.
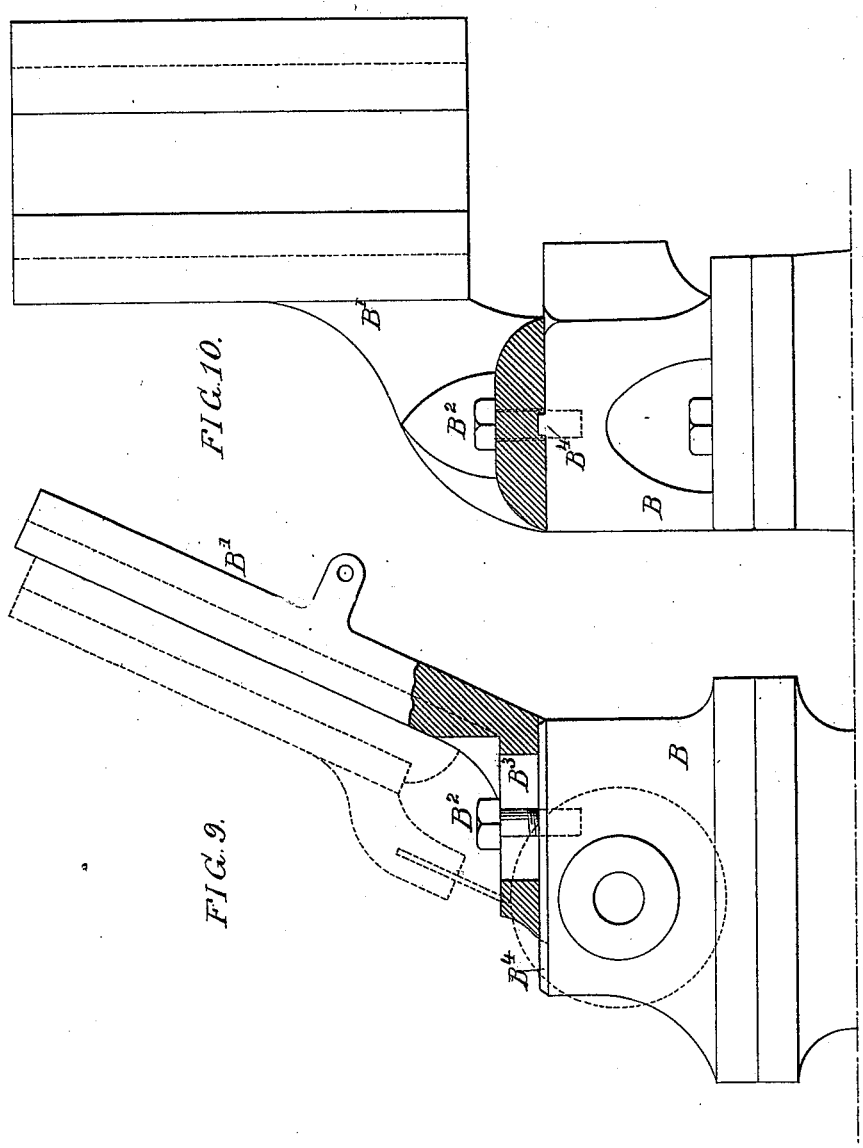
WITNESSES:
Harry Drury
David Williams
INVENTOR:
Josiah F. French
by his Attorneys
Howson & Sons

UNITED STATES PATENT OFFICE.

JOSIAH F. FRENCH, OF PHILADELPHIA, PENNSYLVANIA.

FILE-CUTTING MACHINE.

SPECIFICATION forming part of Letters Patent No. 333,458, dated December 29, 1885.

Application filed July 15, 1882. Serial No. 66,850. (No model.)

*To all whom it may concern:*

Be it known that I, JOSIAH F. FRENCH, a citizen of the United States, and a resident of Philadelphia, Pennsylvania, have invented certain Improvements in Machinery for Nicking File-Blanks, of which the following is a specification.

This invention relates to machinery for nicking the edges or corners of file-blanks preparatory to the formation of the teeth in the sides of the same, and especially to machines of this class in which the file-blank is fed forward between a supporting-drum and pressure-rollers, and during its passage is acted upon by a rapidly-reciprocating chisel, the latter and the mechanism for reciprocating it being carried by a sliding head adjustable in the frame of the machine, so as to lift the chisel and pressure-rollers from the file or lower them onto the file, as desired.

The improvements comprise certain details in the construction of the machine, for the purpose of rendering the same more effective in operation, the improvements being too fully set forth hereinafter to need detailed preliminary explanation.

Figure 4:
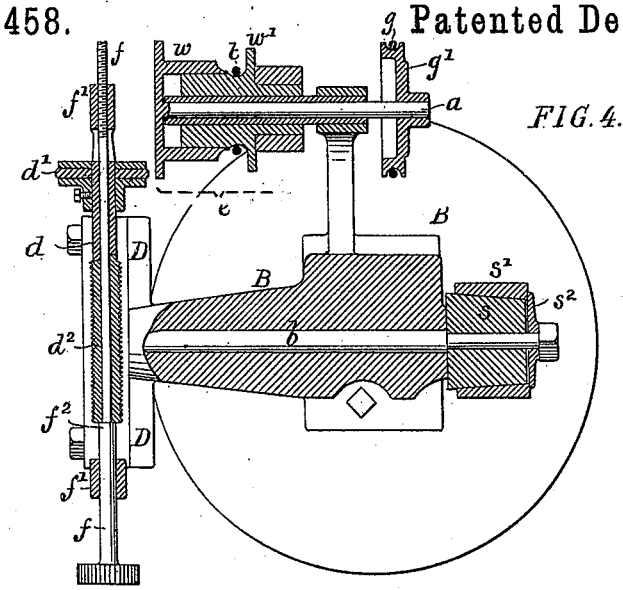
Figure 5:
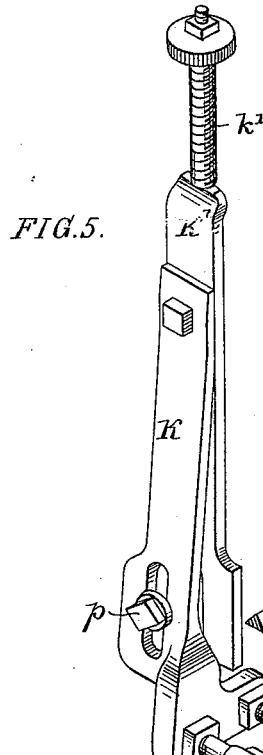
Figure 6:
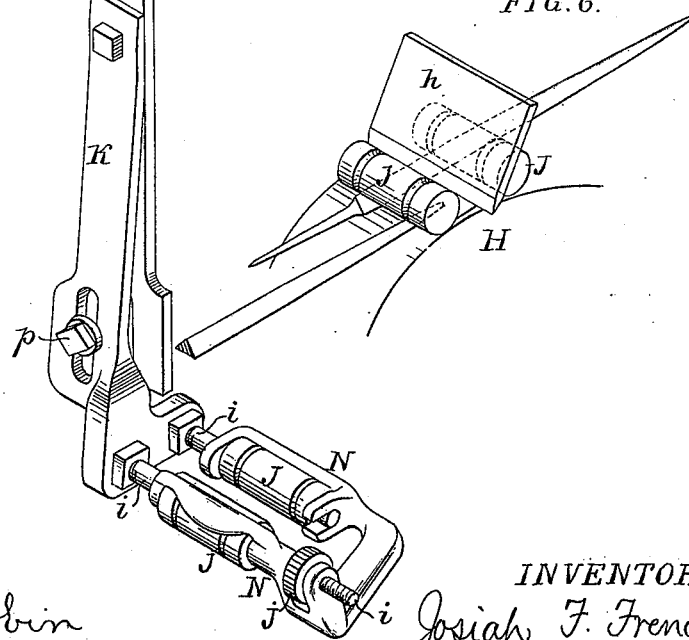

In the accompanying drawings, Figure 1, Sheet 1, is an end view of the machine; Fig. 2, Sheet 2, a front view of the same, looking in the direction of the arrow, Fig. 1; Fig. 3, a view of the opposite end of the machine from that shown in Fig. 1; Fig. 4, Sheet 3, a sectional plan on the line 1 2, Fig. 2; Fig. 5, a perspective view of a detached part of the machine; Fig. 6, a perspective diagram illustrating one of the features of my invention; Fig. 7, Sheet 2, a plan view on the line 3 4, Fig. 2; and Fig. 8, a detached section of part of the machine. Figs. 9 and 10, Sheet 4, are views, on an enlarged scale, of part of the frame of the machine, showing one of the features of the invention.

The machine is one of that general character in which the file-blanks are fed under a rapidly-reciprocating chisel, the edges of the blanks being subjected to the action of this chisel, which cuts the desired nicks in said edges.

A is a column or standard, to the top of which is secured a substantial frame, B, and in the latter are formed bearings for the driving-shaft $a$ and feed-shaft $b$, these two shafts being geared together by means of a sleeve, $d$, which has a friction-disk, $d'$, and a worm, $d^2$, the disk $d'$ being driven by contact with the end of a drum, $e$, on the driving-shaft, and the worm $d^2$ gearing into a worm-wheel, $d^3$, on the end of the shaft $b$. The sleeve $d$ is adapted to turn freely on a shaft or spindle, $f$, which is adapted to bearings $f'$ in a bracket, D, secured to the frame B, one of these bearings having an internal thread adapted for the reception of a threaded portion of the spindle $f$. A shoulder, $f^2$, on the spindle $f$ forms a bearing for the end of the sleeve $d$, and the projecting end of the spindle $f$ has a milled head, $f^3$, whereby it may be manipulated for a purpose described hereinafter. A belt, $g$, passes round a pulley, $g'$, on the driving-shaft, and round a pulley, $g^2$, on a shaft, $g^3$, adapted to bearings in a head, F, which is adapted to slide in, and is guided by an inclined arm, B', on the frame B, said shaft $g^3$ having a balance-wheel, $g^4$, and being furnished with a cam, $g^5$, which acts upon a slide, G, adapted to guides in the head F, this slide carrying at the lower end the cutting-chisel $h$, and being acted upon at the upper end by a spring, $h'$, the tendency of which is to depress the slide, the tendency of the cam $g^5$ being to elevate the same, so that as the shaft $g^3$ is rotated a rapid reciprocating motion will be imparted to the chisel-slide.

The file-blank is confined between a lead-covered drum H on the feed-shaft $b$ and a pair of grooved rollers, J, the latter being adapted to turn on spindles $i$, carried by and projecting from an elastic bar, K, which is secured at its upper end to a bar, K', the two bars being secured to the head F in such a manner as to admit of vertical adjustment in respect thereto, the upper end of the bar K' having a stem, $k$, which fits within a tubular set-screw, $k'$, adapted to a lug, $k^2$, on the head F, the screw $k'$ being confined between a shoulder, $k^3$, and a nut, $k^4$, on the stem $k$. As the file-blank is passed between the feed-drum H and the grooved rollers J J, the latter are pressed firmly upon the blank, owing to the fact that weights $l$ are hung to the sliding head F in order to depress the same. One of the flat faces of the file rests upon the drum H, the upper corner of the file being adapted to the grooves of the rollers J, and being subjected to the action of the rapidly-reciprocating chisel $h$ as the blank is fed through the machine in the direction of the arrow, Fig. 1, the head F and all of the parts carried thereby rising or falling as the rollers J accommodate themselves to the taper of the blank. The force of the blow delivered by the chisel $h$ is dependent partly upon the tension of the spring $h'$ and partly upon the extent of movement of the chisel before the cutting-edge of the same reaches the blank after the chisel-slide has been released from the lifting action of the cam $g^5$. This movement I regulate by the vertical adjustment of the head F in respect to the rollers J J, this adjustment being effected by the set-screw $k'$, and the effect of the adjustment being that the more the head is elevated the longer will be the stroke of the chisel and the greater the force of the blow upon the blank.

Owing to the rapid rate at which the chisel-slide G is reciprocated, its momentum has a tendency to cause it to rise above the point to which it is elevated by the cam $g^5$, and unless this tendency is checked the action of the chisel on the file-blank becomes irregular, and imperfect work is produced. I therefore secure to one side of the head F a projecting toe, $m$, so adjusted that when the chisel-slide has been fully elevated by the cam an arm, $m'$, on said slide comes into contact with the toe $m$ and prevents any farther upward movement of the slide, the "jumping" of which is thus effectually prevented.

When the file-blank has been nicked, it becomes desirable to elevate the chisel-slide and head F during the removal of the blank. This I effect by means of a treadle, M, which is connected by a rod, $n'$, to an arm, $n$, hung to a lug on the arm B' of the frame B, the arm being elevated as the treadle is depressed, and the outer end of the arm acting first upon the arm $m'$ of the chisel-slide, and then, through the medium of said arm and the toe $m$, upon the head F, the elevation of which is thus caused to follow the elevation of the chisel-slide.

After the file-blanks have been presented for some time to a particular portion of the cutting-edge of the chisel, that portion of said edge becomes worn, and it is desirable to shift the cutting duty to some other part of the edge, so that all parts of the latter may be rendered available for cutting before the chisel is discarded. This adjustment I effect by means of a yoke, N, which embraces the rollers J J, and is adapted to slide with the same on the spindles $i\ i$, a nut, $j$, confined between lugs on the yoke being adapted to a threaded portion of one of said spindles $i$, so that by turning said nut the yoke and the rollers J can be caused to traverse on the spindles, and the blank-guiding grooves of the rollers caused to occupy different lateral positions in respect to the edge of the chisel, one portion of which after another is thus brought into action and made to do cutting duty.

Each roll J may have but a single groove; but I prefer to provide each roll with two or more grooves for the following reason: When but a single groove is used, a fresh blank cannot be introduced between the rollers J and drum H until the previous blank has been discharged, whereas when two or more grooves are used the point of a fresh blank may be inserted into one pair of grooves during or immediately upon the finish of the cutting operation on a file in the other pair of grooves, so that as soon as the nicked file is delivered a fresh file is already in position for the action of the cutting-chisel, the action of the machine being thus rendered as nearly continuous as possible.

Other means than the yoke N may be used for effecting the adjustment of the rollers upon the spindles $i$; but the yoke is a simple means of effecting the simultaneous adjustment of both rollers, and is therefore preferred.

It is important to the proper support of the file-blank that the rollers J J should be arranged as closely together as possible, only sufficient space being left between them for the proper working of the chisel. If the rollers occupied a fixed and unchangeable relation to the latter, difficulty would be experienced in the working of the machine, owing to the fact that slight differences in size or shape are bound to exist in the chisels; hence the importance of some means of adjusting the rollers in respect to the chisel. For this reason I use the elastic bar K, the lower end of which can be moved inward by tightening the set-screw $p$, which is adapted to a slot in the bar K and screws into the head F, the elasticity of the bar causing it to move outward when the set-screw is slackened.

A bar, K, pivoted at the upper end and controlled as to its movement in both directions by the set-screw, may be used in place of the elastic bar, if desired.

The feed-drum H consists of a tapering core, $s$, secured to the feed-shaft $b$, and having an external ring, $s'$, of lead, tapered internally to correspond with the tapered core, upon which the ring is forced by means of a plate, $s^2$, and nut $s^3$ at the end of the shaft $b$. The rate of feed of the blank is governed by the adjustment of the sleeve $d$ in respect to the driving-shaft $a$. Thus the nearer the disk $d'$ is adjusted to the center of the drum $e$ the slower will be the rotation of said sleeve and the feed-shaft, the rate of speed increasing as the disk $d'$ is moved toward the circumference of the drum, as will be readily understood. Owing to the fact that both the disk $d'$ and worm $d^2$ are adjusted together on the shaft or spindle $f$, however, a new result is obtained—that is, the presentation of a new portion of the worm to the worm-wheel on each change of feed. The rapid wear of a few of the teeth of the worm by continuous use of these teeth only is thus prevented, the wear being distributed over a large number of the teeth.

The sleeve $d$ may be continuous, if desired; but I prefer to make it in two sections, one carrying the worm $d^2$ and the other the disk $d'$, so that the worm can be renewed without necessitating the renewal of the disk. The abutting ends of the two sections are constructed in a manner similar to a clutch, so that the two sections are compelled to turn together.

The adjustment of the sleeve $d$ is effected by means of the shaft $f$ against a shoulder, $f^2$, on which the sleeve $d$ bears, the contact of the sleeve with this shoulder at all times being insured, owing to the fact that the disk $d'$ has a tendency to continually seek a position as far from the center of the drum $e$ as possible. The use of a sleeve, $d$, and shaft $f$ in this connection is not absolutely necessary to my invention. For instance, the disk $d'$ and worm $d^2$ may, if desired, be carried by a shaft turning on pivots at each end, these pivots being adjustable, in order to shift the position of the disk and worm.

The drum $e$ on the driving-shaft comprises two parts—namely, a portion, $w$, secured to the shaft, and a portion, $w'$, loose on the shaft and capable of sliding longitudinally thereon, that is to say, from and toward the fixed half $w$ of the drum—the adjustment of the loose half of the drum being effected by means of a lever, $x$, hung to a stud on the frame B, and adapted to act upon a collar, $x'$, which fits over a reduced portion of the drum $w'$, and acts upon a flange on the same, the long arm of the lever being retained in any position to which it may be adjusted by engagement with a notched segmental bar, $x^2$. (See Figs. 2, 3, 4 and 7.)

When the machine is out of gear, the end of the drum $e$ is free from contact with the disk $d'$, and the driving-belt $t$ is adapted to the loose half $w'$ of the drum, as shown in Fig. 4. On no power being transmitted to the shaft $a$. On moving the lever $x$ in the direction of the arrow, Fig. 7, however, the machine will be thrown into gear, the first effect of the movement being to crowd the belt up onto the inclined end of the fixed half $w$ of the drum, thereby throwing the shaft $a$ into gear, and on continuing the movement the end of the drum will be pressed against the periphery of the disk $d'$ with a force dependent upon the extent of the movement of the lever $x$. The machine is thrown out of gear by a reversal of the above-described operations, the tendency of the belt $t$ to resume the position shown in Fig. 4 causing the loose portion $w'$ of the drum to be retracted when it is released from the control of the lever $x$, and frictional driving contact of the portion $w$ of the drum with the disk $d'$ ceasing as soon as pressure is removed therefrom.

It will be noticed that the bar K and the rollers carried thereby act in the nature of a presser-foot to keep the file always in contact with the drum.

The combination of the adjustable presser-foot with the sliding head and its reciprocating chisel is an important feature of my invention, as it not only enables me to regulate the force of the blow of the chisel, but also to compensate for wear of the latter without the necessity of adjusting the chisel on the chisel-slide.

Although I have alluded to rollers in connection with the presser-foot, I consider a grooved or plain bar or plate to be the equivalent of a roller in some cases, and where I use the term "roller" I intend to include such bar or plate.

The use of two rollers on the presser-foot is not necessary to the proper carrying out of my invention in all cases, as the cutting of some classes of files can be successfully accomplished when but one roller is used.

The arm B' of the frame B, which carries the head F, is adjustable on the frame B, so that the parts may be so adjusted that the chisel $h$ will always strike as nearly as possible in line with the center of the drum H. The arm B' is secured to the frame B by a bolt, $B^2$, adapted to a slot, $B^3$, in the arm, as shown in Figs. 9 and 10, and said arm is properly guided on the frame by means of a lug, $B^4$, adapted to a groove in the under side of the arm.

It sometimes happens that a machine will be run on files which do not vary much in the character of the teeth, and in such cases there would be no material variation in the feed and no extended movement of the power-transmitting shaft or sleeve $d$; hence a few only of the teeth of the worm $d^2$ would be subjected to wear. In order to provide for the shifting of the worm under these circumstances, I make the disk $d'$ adjustable on the shaft or sleeve, as shown in Fig. 4, so that by a proper shifting of this disk when one part of the worm $d^2$ becomes worn a new part may be brought into use, the shaft $f$ or other adjusting device of course being shifted to correspond with the change in the position of the disk.

It will be noticed that all of the adjustable portions of the machine are readily accessible to the operator at the front of the machine, and in practice it has been found that most of the adjustments alluded to in this specification can be effected during the operation of the machine and without interfering with the proper performance of the duty of any of the parts.

I do not desire to claim, broadly, the combination of the supporting and driving drum with an adjustable head carrying pressure-rollers, and provided with guides for the chisel-slide and with a cam for reciprocating the latter, as such machines have been heretofore devised.

I claim as my invention—

1. The combination of the head F and its reciprocating slide and chisel with pressure-rollers J, arranged in front and rear of the chisel, and adjustable together from and toward said chisel, as set forth.

2. The combination of the head F, its reciprocating chisel-slide, and the chisel rigidly secured thereto, with a grooved pressure-roller, J, adjustable to and fro across the face of the chisel, as specified.

3. The combination of the head F and its reciprocating chisel-slide with a pair of grooved pressure-rollers, J, and a yoke, N, connecting the same for simultaneous operation, as set forth.

4. The combination of the head F and its reciprocating chisel-slide with one or more pressure-rollers, J, the spindle or spindles of the same, a yoke, N, and a nut, $j$, for actuating the same, as set forth.

5. The combination of the frame and the head F, adjustable vertically therein, and carrying a chisel-slide and its reciprocating mechanism, with the supporting-drum H and a presser-foot, forming the sole support of the frame upon the file, but adjustable vertically in respect to said frame, whereby the impact of the chisel is regulated without variation in the reciprocating mechanism, as set forth.

6. The combination of the head F and its reciprocating chisel-slide with a supporting-drum, H, a pressure roller or rollers, a bar, K, carrying the same, a bar, K', to which the bar K is secured, and a set-screw connected to the bar K' and serving to adjust the same in respect to the head F, as set forth.

7. The combination of the head F and its reciprocating chisel-slide, the pressure roller or rollers J, the bar K, carrying the same, and a set-screw, $p$, whereby said bar K is adjusted, as set forth.

8. The supporting-drum H, comprising the tapered core $s$, soft-metal ring $s'$, and end plate, $s^2$, adapted to press upon the ring and force it onto the core, as set forth.

9. The combination of a head, F, and a reciprocating chisel-slide with the support H and a pressure-roller, J, having two or more grooves side by side therein, where one file can be introduced into the machine before the preceding file has been discharged therefrom, as set forth.

10. The combination of the driving and feed shafts of the machine with the intervening worm and differential speeding-gear, said worm and the disk $d'$ of the gearing being constructed as described, so as to be adjusted simultaneously, whereby the portion of the worm subjected to wear is changed with each change of feed, as set forth.

11. The combination of the driving and feed shafts, the sleeve $d$, with its worm $d^2$ and friction-disk $d'$, and the shouldered and threaded shaft $f$, as set forth.

12. The combination of the driving and feed shafts with a sleeve, $d$, made in sections clutched together when in operation, one section carrying the worm $d^2$ and the other the friction-disk $d'$, as set forth.

13. The combination of the driving-shaft $a$ with the drum $e$, comprising the fast section $w$ and loose section $w'$, the latter sliding from and toward the fixed section, and serving to apply the belt thereto, as set forth.

14. The combination of the drum $e$, comprising the fast and loose sections $w$ $w'$, with the operating-lever $x$ and the notched retaining-bar $x^2$, as set forth.

15. The combination of the driving and feed shafts with the worm $d^2$, an adjustable sleeve carrying the same, and a friction-disk, $d'$, adjustable on said sleeve, as set forth.

16. The combination of the supporting-drum, the head F and its reciprocating chisel-slide, an arm, B', carrying said head and guided on the frame B, and a retaining-bolt adapted to a slot in said arm, as specified.

In testimony whereof I have signed my name to this specification in the presence of two subscribing witnesses.

JOSIAH F. FRENCH.

Witnesses:
HARRY DRURY,
HARRY SMITH.